United States Patent [19]

Maurel et al.

[11] 4,423,009

[45] Dec. 27, 1983

[54] CARBONATE, SULPHATE AND HYDROXIDE OR HYDROGEN CARBONATE

[75] Inventors: Pierre Maurel; Francois Nicolas, both of Aix-en-Provence, France

[73] Assignee: Aluminium Pechiney, Lyons, France

[21] Appl. No.: 246,398

[22] Filed: Mar. 23, 1981

[30] Foreign Application Priority Data

Apr. 2, 1980 [FR] France ............................... 80 07878

[51] Int. Cl.³ ................... C01G 56/00; C01G 31/00; C01G 39/00
[52] U.S. Cl. ....................................... 423/15; 423/17; 423/55; 423/58; 423/65
[58] Field of Search ................... 423/11, 15, 17, 55, 423/58, 65

[56] References Cited

U.S. PATENT DOCUMENTS

| | | | |
|---|---|---|---|
| 2,949,339 | 8/1960 | Maruin | 423/55 |
| 3,151,932 | 10/1964 | Reussir et al. | 423/15 |
| 4,321,235 | 3/1982 | Monret et al. | 423/15 |

FOREIGN PATENT DOCUMENTS

2460277 2/1981 France ................................ 423/15

*Primary Examiner*—Herbert T. Carter

*Attorney, Agent, or Firm*—McDougall, Hersh & Scott

[57] ABSTRACT

Process for the purification of an aqueous solution containing alkali metal carbonate, sulphate, and hydroxide or hydrogen carbonate and primarily one at least of the metals belonging to the group formed by vanadium, uranium and molybdenum, in the form of alkali metal salts, and mineral and/or organic impurities, said solutions resulting from an ore attack cycle and being taken off after extraction of the metal being sought, which comprises treating said solutions by means of lime at a temperature which is at most equal to the boiling temperature, to convert the carbonate and hydrogen carbonate present into alkali metal hydroxide, then effecting separation and washing of a first precipitate of calcium carbonate and a liquor which is enriched in respect of alkali metal hydroxide, concentrating it by evaporation to cause production of a second precipitate which essentially comprises alkali metal sulphate, separating it from the hydroxide-rich liquid phase, re-dissolving it in an aqueous medium and treating the resulting alkali metal sulphate solution by means of barium aluminate and then carbon dioxide, and separating the resulting precipitate which is subjected to a heat treatment to regenerate the barium aluminate which is recycled.

13 Claims, 1 Drawing Figure

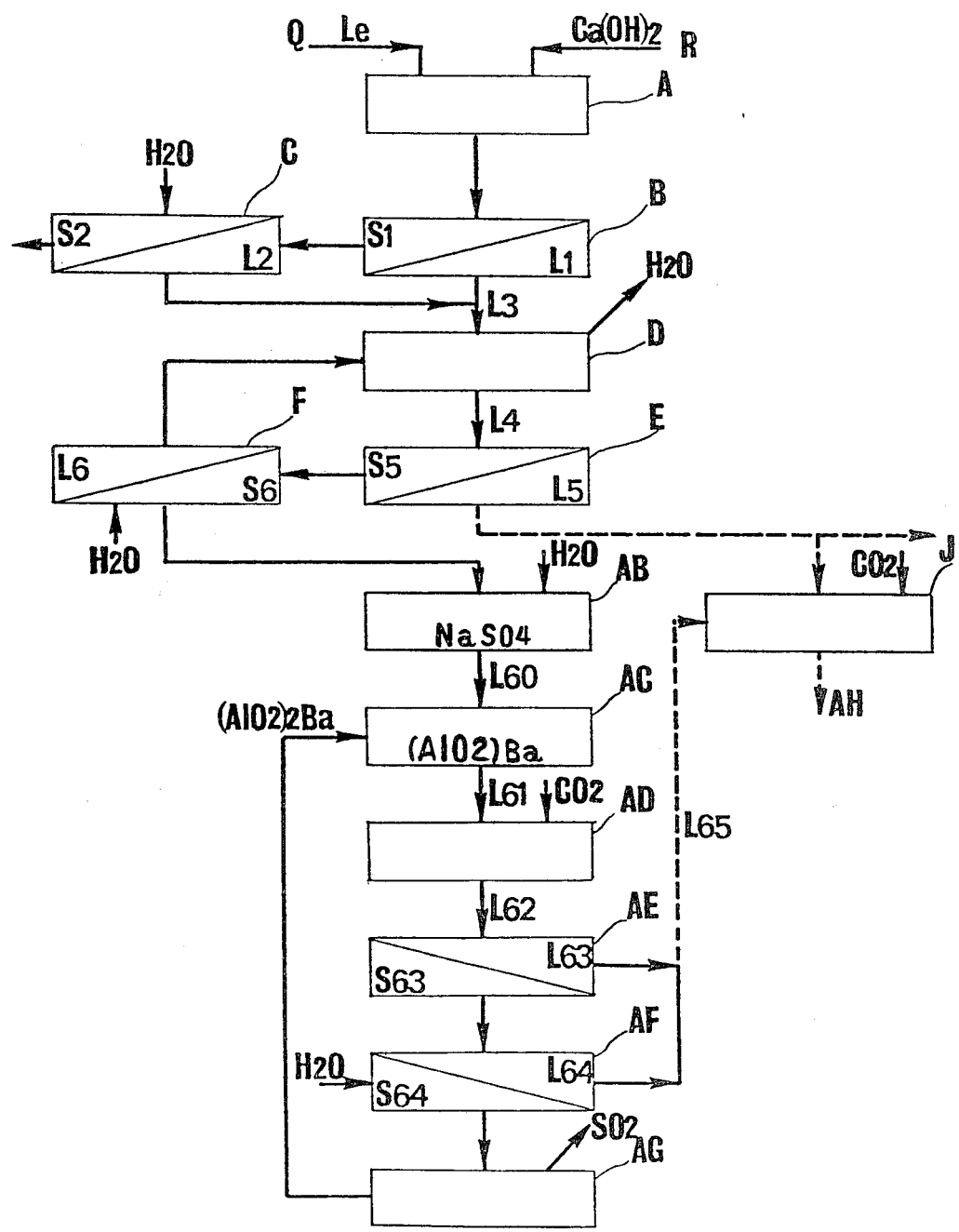

CARBONATE, SULPHATE AND HYDROXIDE OR HYDROGEN CARBONATE

The present invention which relates to a process for the purification of solutions containing alkali metal carbonate, alkali metal sulphate, alkali metal hydroxide or alkali metal hydrogen carbonate, and one at least of the metals vanadium, uranium and molybdenum, and mineral and/or organic impurities, concerns improved purification in respect of alkali metal sulphate.

In French Pat. No. 2 404 601 of Sept. 30, 1977, the applicants described a process for the purification of solutions containing sodium carbonate, sodium sulphate, sodium hydroxide or sodium hydrogen carbonate, and one at least of the metals belonging to the group comprising vanadium, uranium and molybdenum in the form of sodium salt.

These solutions resulted from a cycle of attacking a uraniferous or vanadiferous ore which may also contain molybdenum, after precipitation and separation of the metal which is to be put to use, using a known method.

Thus, in the case for example of a uraniferous ore, wherein the ore is attacked by means of a sodium carbonate and/or bicarbonate liquor, the solubilised uranium which is present in the liquor after the attack operation was usually precipitated in the form of sodium uranate. The sodium uranate could be converted by known means, for example:

either into crystallised ammonium uranate, by sulphur-ammonium transportation which consisted of treating the sodium uranate with a solution of ammonium sulphate, or by sulphuric redissolution and precipitation of the uranium peroxide by introducing hydrogen peroxide.

Irrespective of the method used for precipitation and separation of the uranium, such operations resulted in solutions containing sodium carbonate, sodium sulphate, free sodium hydroxide or sodium hydrogen carbonate, which had to be purified before being recycled to the ore attack operation.

It is with this in mind that the applicants, in French Pat. No. 2 404 601 of Sept. 30, 1977, described a process for purification of the above-mentioned solutions, which was characterised in that said solutions were treated at a temperature which is at most equal to boiling temperature, with an amount of lime which is from 0.1 to 20 times the stoichiometric amount required for converting the carbonates and hydrogen carbonates present into sodium hydroxide, without taking into account the amount of lime necessary for precipitating the insoluble metallic calcium compounds, followed by separation and washing of a first precipitate essentially containing calcium carbonate and a mixture of other organic and inorganic calcium salts and a liquor which had become enriched in respect of sodium hydroxide, that the mixture of said liquor and the liquor for washing the first precipitate was concentrated by evaporation until the sodium hydroxide content was at most equal to 50%, in order to cause the production of a second precipitate, that the crystals of said second precipitate were separated from their sodium hydroxide-rich mother liquor, and that said sodium hydroxide-rich liquor was recovered.

In the foregoing process, the second precipitate essentially comprised sodium sulphate which was extracted from the treatment cycle.

After it has been removed from the treatment cycle, the sodium sulphate could be put to use in industrial applications, or stored in a suitable location such as back-fill regions, former quarries, etc, or discharged into natural discharge systems such as rivers and streams.

However, as the amounts of sodium sulphate may be very substantial, it was no longer possible, from the environment point of view, to deal with the sodium sulphate by means of one or other of the discharge methods referred to above.

Hence, it became essential to find a process which makes it possible to remove sodium sulphate, a by-product resulting from the process described in French Pat. No. 2 404 601 of Sept. 30, 1977, without causing harmful environmental pollution.

The applicants have now discovered that it was possible to effect complete elimination of the alkali metal sulphate, by a process for the chemical treatment of that precipitate.

The novel process for the complete elimination of the alkali metal sulphate which is contained in solutions to be purified, which also contain alkali metal carbonate, hydroxide or hydrogen carbonate, one at least of the metals belonging to the group formed by vanadium, uranium and molybdenum, in the form of alkali metal salts, and mineral and/or organic impurities, said solutions resulting from a cycle of attack on one of said ores and extraction of the metal which is solubilised in the attack operation, said solutions being raised to a temperature which is at most equal to boiling temperature and then treated by caustification by introducing lime to convert the carbonates and hydrogen carbonates present into alkali metal hydroxide, collecting a first precipitate essentially containing calcium carbonate and a liquor which is enriched in respect of alkali metal hydroxide, said alkali metal hydroxide-enriched liquor being concentrated by evaporation until the hydroxide content is at most equal to 50%, to cause the production of a second precipitate comprising alkali metal sulphate, is characterised in that, after the alkali metal sulphate precipitate has been dissolved in an aqueous medium, the solution produced is treated with an amount of barium aluminate which is at least equal to the stoichiometric amount required to cause precipitation of the sulphate ions, followed by carbonation by injecting carbon dioxide, and that there are separated a liquor, the carbonation of which is subsequently completed before it is recycled, and a precipitate containing barium sulphate, barium carbonate and aluminum hydroxide which is calcined, restoring the barium aluminate which is recycled, $SO_2$ which can be recovered, and $CO_2$.

In the solutions to be treated in accordance with this invention, the levels of concentration in respect of alkali metal sulphate, carbonate, hydroxide and hydrogen carbonate, in the absence of hydroxide, and alkali metal compounds of at least one of the metals of the group formed by uranium, molybdenum and vanadium, are not critical.

The relative contents thereof may vary within wide limits, without interferring with proper operation of the process according to the invention.

The alkali metal compounds such as sulphate, carbonate, hydroxide or hydrogen carbonate are those of sodium and potassium.

Hereinafter in the description of the process according to the invention, reference is made only to sodium compounds, it being appreciated that potassium compounds can be treated in the same manner.

In its essential features, the novel process for the elimination of the sodium sulphate which is contained in the solutions to be purified, resulting from uraniferous, vanadiferous and/or molybdeniferous ore treatment, comprises the following steps, some of which have already been described in the main patent:

caustification of the solutions by an amount of lime which is between 0.1 and 20 times and preferably 0.5 and 10 times the stoichiometric amount for converting the carbonates present into sodium hydroxide, separation of a first precipitate which is impregnated with mother liquors and which comprises a mixture of organic and inorganic calcium salts from an alkaline liquor which is enriched in respect of sodium hydroxide and contains sodium sulphate, the liquor from washing the first precipitate being added to the above-mentioned alkaline liquor, concentration of the resulting liquor by evaporation until a second precipitate is produced, separation of the crystals of the second precipitate which is impregnated with a sodium hydroxide-rich mother liquor, washing the second precipitate with recycling of the washing liquors to the concentration step, recovery of a first sodium hydroxide-rich liquor, dissolution of the sodium sulphate precipitate in an aqueous medium, treatment of the sodium sulphate solution with barium aluminate, carbonation with carbon dioxide of the sodium sulphate solution which has been treated with barium aluminate, separation of a precipitate comprising a mixture of barium sulphate, barium carbonate and aluminium hydroxide from a second liquor containing sodium carbonate, which is generally combined with the first sodium hydroxide-rich liquor, and finally calcination of the precipitate formed by the mixture of barium sulphate and aluminium hydroxide, with recycling of the regenerated barium aluminate and the emission of sulphurous gas which may be recovered and carbon dioxide.

As described in the main patent, caustification of the solutions to be purified is effected by introducing an amount of lime which is at least equal to the stoichiometric amount required for virtually complete conversion of the sodium carbonate and hydrogen carbonate present in the liquor, into sodium hydroxide, in accordance with the following reactions:

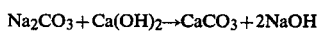

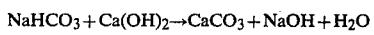

When the solutions to be caustified contain metal salts which, with the lime and under the operating conditions involved, are likely to form an insoluble compound, the total amount of lime introduced is the amount of lime which is actually necessary for caustification of the dissolved carbonate and hydrogen carbonate and the amount of lime required to precipitate said metal constituents in the form of insoluble calcium compounds. Accordingly, and in order to simplify understanding of the subject of this invention, reference will be made only to the amount of lime which is actually necessary just for caustification of the sodium carbonate and hydrogen carbonate.

The corresponding temperature of the caustification treatment is at most equal to the boiling temperature of the liquor being treated. It is therefore between 20° C. and 100° C. but preferably between 50° C. and 97° C., precipitation and filterability of the resulting residue being improved, in the majority of cases, when the caustification temperature is close to the boiling temperature.

The precipitate essentially comprises calcium carbonate and the excess of lime and, in a minor amount, organic and inorganic calcium salts.

Separation of the first precipitate and the mother liquor containing the sodium hydroxide is effected by a known means such as filtration, draining, settling, etc.

The liquor containing the sodium hydroxide is then subjected to concentration by evaporation until the NaOH concentration is at most 50%, and is such that the residual sodium sulphate content in the liquor after evaporation is adjusted to the desired value as set forth in French Pat. No. 2 404 601.

A second precipitate is then collected, which comprises sodium sulphate which is separated from the NaOH-rich mother liquor by a known method, and then washed with water or with a sodium sulphate saturated aqueous solution, with the washing liquor being recycled to the concentration step.

According to the process of this invention, the second precipitate which comprises sodium sulphate is then treated with an aqueous medium in which dissolution of the $Na_2SO_4$ is effected. The aqueous medium used may be water but it may also be a recycling liquor.

Precipitation of $SO_4^{--}$ ions is then effected, in the form of barium sulphate, by introducing barium aluminate into the solution containing the $Na_2SO_4$ and which is maintained in an agitated condition.

The barium aluminate may be introduced into the medium to be treated in the form of an aqueous solution of barium aluminate, in the form of an aqueous suspension or in powder form.

The temperature at which treatment of the aqueous sodium sulphate solution with barium aluminate is effected is less than 100° C.; it is preferably between 50° C. and 80° C.

The time required for precipitation of the $SO_4^{--}$ ions may vary widely; it is between 0.5 hour and 24 hours depending on the composition of the liquor to be treated, but it is preferably between 2 hours and 4 hours, depending on the desired precipitation yield.

Carbonation of the suspension is then performed by injecting carbon dioxide.

A substantial fraction of the barium ions which are introduced into the aqueous sodium sulphate solution precipitates in the form of barium carbonate in accordance with the following reactions:

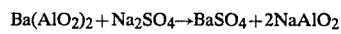

then

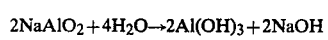

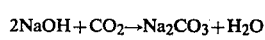

and also

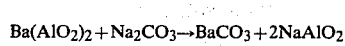

as a secondary reaction.

The amount of carbon dioxide required for carbonation of said suspension is at least equal to the stoichiometric amount of $CO_2$ corresponding to the amount of barium used in the form of barium aluminate.

The amount of barium aluminate which is generally used for the precipitation operation is close to the stoichiometric amount required for precipitating the $SO_4^{--}$ ions. In fact, the applicants have found that, when for example the concentration in respect of $Na_2SO_4$ in the initial aqueous solution is reduced from 22% to 10%, the amount of $SO_4^{--}$ ions precipitated respectively approaches 85% in the first case and rises to about 95% in the second case. However, dilution of this kind suffers from the disadvantage that it involves introducing into the treatment cycle an additional volume of water which subsequently has to be removed. When the initial concentration in respect of $Na_2SO_4$ in the initial aqueous solution is not reduced, the use of a sub-stoichiometric amount of barium aluminate makes it possible to reduce the mass of $BaCO_3$ which is precipitated at the same time with $BaSO_4$, while however, after separation of the precipitate, leaving a larger amount of $Na_2SO_4$ remaining in solution in the recycled liquor.

The resulting precipitate which comprises a mixture of barium sulphate, barium carbonate and aluminium hydroxide is separated from the sodium carbonate-rich liquor which is combined with a portion of the liquor which has been previously separated from the sodium sulphate precipitate, to be passed to the carbonation step.

After elimination of the impregnation mother liquor, that precipitate, formed by the above-mentioned mixture, is subjected to calcination in a reducing medium at a temperature of between 1100° and 1500° C., thus providing for regeneration of the barium aluminate which is recycled to the sulphate ion precipitation zone.

As set forth in the main patent application, the hydroxide-rich mother liquor resulting from caustification and elimination of the sulphate ions may be subjected to a conversion treatment before being used in the production cycle such as the ore attack operation. Thus, the hydroxide-rich mother liquor may be partially or totally carbonated by bringing it into contact with carbon dioxide in accordance with known means, for example by blowing in a large excess of carbon dioxide. Depending on the conditions under which that operation is performed, it is possible to produce a precipitate which comprises a mixture of sodium carbonate and sodium hydrogen carbonate, which can be subsequently separated.

In accordance with a further provision of the process described in the main application, in treating the solutions with lime, incomplete caustification of the sodium carbonate may occur, in spite of the fact that a large excess of lime is introduced, or else it may be found desirable to effect controlled caustification of the carbonate by introducing a sub-stoichiometric amount of lime. Accordingly, in the course of the operation of concentrating the alkaline mother liquor by evaporation, there is produced a precipitate which may comprise either the double salt $2Na_2SO_4.Na_2CO_3$, or a mixture of sodium carbonate and the above-indicated double salt or, finally, a mixture of sodium sulphate and the double salt, the production of one of the three possible precipitates essentially depending on the compositions of the alkaline liquor after caustification and the degree of evaporation effected. In this case, the precipitate formed by the double salt $2Na_2SO_4.Na_2CO_3$ or the mixture of sodium carbonate and the double salt or the mixture of sodium sulphate and the double salt is treated by an aqueous medium in which said salts are dissolved. The aqueous medium used may be water but it may also be a recycling liquor. Precipitation of the $SO_4^{--}$ ions preferentially and $CO_3^{--}$ ions is then effected in the form of $BaSO_4$ and $BaCO_3$ by introducing barium aluminate into the above-mentioned solution which is maintained in an agitated condition, in a similar manner to the method described in regard to sodium sulphate alone. While sodium salts are noted in the above discussion, it is understood that the general formulas $2MSO_4.MCO_3$, $MSO_4$ or $MCO_3$ in which M is an alkali metal are included.

Whether caustification is complete or incomplete, the NaOH-rich mother liquor which is produced by liquid-solid separation after evaporation still contains organic impurities which are removed by one or other of the complementary treatments set forth in the main patent application.

Likewise, carbonation of the hydroxide-rich mother liquor may be effected, as already set forth.

In accordance with a particular situation where the solution to be purified resulting from treatment of the uraniferous ore contains a sufficiently substantial amount of molybdenum to justify recovery thereof, and the molybdenum was precipitated in the form of sodium molybdate at the same time as the sodium sulphate in the operation of concentration by evaporation, it may be an attractive proposition to effect extraction thereof after dissolution of the mixture of sodium sulphate and molybdate, for example by introducing sulphide ions, and with adjustment in respect of the acidity of the medium.

The liquor collected, after separation of the molybdenum, is then treated with barium aluminate in accordance with the process of the invention.

The invention will be better appreciated by reference to the description of the accompanying diagrammatic drawing. The attached drawing is a diagrammatic illustration of the process according to the invention, the solid lines in the drawing showing the circuit used when only sodium carbonate and sodium sulphate resulting from the operations of caustification, separation and concentration as described in the main patent are to be removed, while the broken lines show the circuits for effecting additional carbonation on a fraction of the sodium hydroxide-rich mother liquor resulting from the caustification operation and on the carbonated liquor resulting from precipitation of the sulphate ions by barium.

In the drawing, the alkaline solutions to be treated, as indicated by Le, and the lime required, are introduced at A by way of Q and R. The slurry produced after treatment with the lime is introduced at B where separation of a cake S1 and a liquor L1 is effected. The cake S1 is washed in C with water. The mother liquors L2 which are thus extracted are mixed with the liquor L1, forming the liquor L3. The resulting cake S2 which is extracted from C essentially comprises calcium carbonate. The liquor L3 which is formed by the mixture of liquors L1 and L2, containing sodium hydroxide, is passed into D for effecting concentration by evaporation of water, causing precipitation of a sodium sulphate.

The slurry L4 issuing from the concentration operation is introduced into E for separation of a liquor L5 and a cake S5.

The cake S5 which essentially comprises sodium sulphate is carried over into F where it is subjected to washing either with water or with a sodium sulphate-saturated solution, with recycling of the washing liquor L6 to D.

The cake S6 is then introduced into a zone AB where the sodium sulphate is dissolved in a suitable volume of water and/or recycling liquor.

The resulting sodium sulphate liquor L60 is then passed into the zone AC where the sulphate ions are precipitated by introducing barium aluminate. The resulting suspension L61 is then subjected to carbonation in AD by the injection of carbon dioxide, in order to precipitate aluminium hydroxide having the formula Al(OH)$_3$. The suspension L62 issuing from the carbonation zone AD is then passed into AE where the alkaline liquor L63 and a cake S63 formed by the mixture of barium sulphate, barium carbonate and aluminium hydroxide are separated.

The crystalline mass S63 is then subjected to rinsing in AF by introducing water, giving a liquor L64 which is combined with liquor L63. The crystalline mass S64 which has thus been freed of the impregnation liquor is introduced into a calcination zone AG where the barium aluminate is regenerated and then recycled to AC.

If it is desirable for a fraction of the sodium hydroxide-rich liquor L5 to be carbonated, that liquor is introduced into J so as to undergo carbonation therein, by the injection of CO$_2$. The resulting slurry may be used as produced in AH, as set forth in the main patent.

The advantages of the process according to the invention will be much more readily appreciated by means of the following Example which is given by way of illustration.

EXAMPLE (illustrated by the drawing)

The process according to the invention is performed to treat a residual NaOH-rich solution which is taken off at the end of a uraniferous ore attack cycle, after precipitation and separation of sodium uranate.

The solution Le representing a mass of 861.5 kg was of the following composition by weight:
NaOH—20.8 kg
Na$_2$CO$_3$—44.2 kg
Na$_2$SO$_4$—17.3 kg
Uranium—0.005 kg
Molybdenum—3.9 kg
H$_2$O and various—775.3 kg.

The solution Le was introduced into A with 28 kg of lime for effecting caustification of the carbonate present by heating and maintaining it at a temperature of 95° C. for a period of about 3 hours. The resulting slurry was transferred into B for separation of the solid phase S1 and the liquid phase L1. The cake S1 was then washed in C with 22.5 kg of water. The mother liquors which impregnated the cake S1 were then extracted and combined with the liquor L1 coming from the separation operation in B.

The liquors L1 and L2 formed the liquor L3.

The cake S2 from C was 61.3 kg in weight and was of the following composition by weight:
CaCO$_3$—41.7 kg
Uranium—0.003 kg
Impregnation H$_2$O+various—19.6 kg.

The liquor L3 represented a weight of 850.7 kg and was of the following composition:
NaOH—54.2 kg
Na$_2$SO$_4$—17.3 kg
Uranium—0.002 kg
Molybdenum—3.9 kg
Water+various—775.3 kg.

It was passed into D for concentration by evaporation of 619.9 kg of water.

The slurry issuing from D was transferred into E for separation of a cake S5 and a liquor L5. The cake S5 was then subjected to a washing operation in F, using 1.4 kg of water, giving a cake S6. The washing liquor L6 was recycled to D in order to undergo concentration therein. The cake S6 representing a mass of 15.4 kg was of the following composition by weight:
Na$_2$SO$_4$—14.0 kg
H$_2$O+various—1.4 kg.

The cake S6 was then introduced into AB for the operation of dissolving the sodium sulphate by means of 54 kg of water and 27 kg of a recycled liquor containing 3.1 kg of Na$_2$SO$_4$, 0.3 kg of H$_2$SO$_4$ and 0.008 kg of molybdenum.

The resulting aqueous liquor L60 represented a mass of 96.4 kg which was introduced into the zone AC for precipitation of the SO$_4{}^{--}$ ions by the introduction of 31.5 kg of recycled barium aluminate in powder form, accompanied by 7.2 kg of BaSO$_4$ and 3.2 kg of Al$_2$O$_3$, which had not reacted in the thermal treatment.

A suspension L61 representing a mass of 138.3 kg was obtained at the outlet of AC and was introduced into AD where it was subjected to carbonation by the injection of 5.3 kg of CO$_2$.

The resulting suspension L62 represented a mass of 143.6 kg, the solid phase comprising a mixture of BaSO$_4$, BaCO$_3$ and Al(OH)$_3$ while the liquid phase was an aqueous solution of Na$_2$CO$_3$ still containing a certain amount of Na$_2$SO$_4$.

The suspension L62 was then transferred into AE for separation of a cake S63 and a liquor L63. The cake S63 was then subjected to washing in AF using 30 kg of water, giving a cake S64 and a liquor L64 which was combined with liquor L63, giving the liquor L65. The cake S64 represented a mass of 77.8 kg and was of the following composition by weight:
BaSO$_4$—31.7 kg
BaCO$_3$—3.6 kg
Al(OH)$_3$—19.3 kg
Al$_2$O$_3$—3.2 kg
Impregnation H$_2$O—20.0 kg.

The liquor L65 which is formed by a mixture of liquors L63 and L64 represented a mass of 95.8 kg and was of the following composition by weight:
Na$_2$CO$_3$—10.8 kg
Na$_2$SO$_4$—2.6 kg
Molybdenum—0.008 kg
H$_2$O+various—82.4 kg.

The liquor L5 from the separation operation in E was 216.8 kg in weight and was of the following composition:
NaOH—54.2 kg
Na$_2$SO$_4$—3.3 kg
Uranium—0.002 kg
Molybdenum—3.9 kg
H$_2$O+various—155.4 kg.

The liquors L5 and L65 were separately recycled to the part of the uranium extraction cycle, which is not described in this Example.

It will be understood that various changes and modifications can be made in the details of the above process without departing from the spirit of the invention, particularly as defined in the following claims.

We claim:

1. A process for the treatment of aqueous solutions containing alkali metal carbonate, sulfate, and hydroxide or hydrogen carbonate, at least one metal selected from the group consisting of vanadium, uranium and molybdenum, in the form of alkali metal salts, and inorganic and/or organic impurities, which comprises adding lime to the solution for reaction at a temperature below the boiling point temperature of the solution to precipitate insoluble calcium salts as a first precipitate and to form an alkali metal hydroxide-enriched liquor, separating said precipitate from the alkali metal hydroxide-enriched liquor, concentrating said liquor to provide a solution wherein the alkali metal hydroxide is present in an amount up to 50% by weight of the solution to form a second precipitate containing alkali metal sulfate and the alkali metal hydroxide-enriched liquor, separating the second precipitate from the alkali metal hydroxide-enriched liquor, and recovering the hydroxide-enriched liquor, dissolving the alkali metal sulfate precipitate in an aqueous medium and treating the solution first with barium aluminate and then with carbon dioxide, separating the resulting precipitate and the corresponding liquor which essentially contains carbonate ions, and heating the resulting precipitate to regenerate the barium aluminate for reuse.

2. A process according to claim 1 wherein the treatment of said solutions with lime produces incomplete caustification and precipitation of a double salt $2MSO_4.MCO_3$ or a mixture of said double salt with $MCO_3$ or $MSO_4$ in which M is an alkali metal element, and further including the steps of dissolving the precipitate in an aqueous medium and treating the resulting solution first with barium aluminate and then with carbon dioxide.

3. A process according to claim 2 wherein the aqueous solution that dissolves the alkali metal sulfate, the double salt $2MSO_4.MCO_3$ or a mixture of said double salt with $MSO_4$ or $MCO_3$ in which M is an alkali metal element, is acidified and then treated with sulfide ions to remove the molybdenum present before said solution is treated with barium aluminate and carbon dioxide.

4. A process according to claim 1 wherein the aqueous solution that dissolves the alkali metal sulfate, the double sale $2MSO_4.MCO_3$, or the mixture of said double salt with $MSO_4$ or $MCO_3$ in which M is an alkali metal element, is acidified and then treated with sulfide ions to remove the molybdenum present before said solution is treated with barium aluminate and carbon dioxide.

5. A process according to claim 1 wherein the alkali metal of the alkali metal carbonate, sulfate, hydroxide and hydrogen carbonate is selected from the group consisting of sodium and potassium.

6. A process according to claim 1 wherein the barium aluminate is introduced in powder form.

7. A process according to claim 1 wherein the precipitation treatment with barium aluminate is performed at a temperature less than 100° C.

8. A process according to claim 1 wherein the amount of barium aluminate introduced is stoichiometric and is calculated relative to the amount of sulfate ions present in the alkali metal sulfate containing liquor.

9. A process according to claim 1 wherein the amount of carbon dioxide introduced into the liquor after the precipitation of barium aluminate is at least equal to the stoichiometric amount calculated relative to the amount of barium used in the form of barium aluminate.

10. A process according to claim 1 wherein the precipitate containing barium sulfate, barium carbonate and aluminum hydroxide is heated to a temperature between 1100° C. and 1500° C.

11. A process according to claim 1 wherein the barium aluminate is introduced as an aqueous solution.

12. A process according to claim 1 wherein the barium aluminate is introduced as a suspension.

13. A process according to claim 1 wherein the precipitation treatment with barium aluminate is performed at a temperature between 50° C. and 80° C.

* * * * *